United States Patent
Wu et al.

(10) Patent No.: US 8,425,190 B2
(45) Date of Patent: Apr. 23, 2013

(54) PRESSURE RELIEF DEVICE

(75) Inventors: Chao-Cheng Wu, Tamshui (TW); Jyh-Nan Ho, Tamshui (TW)

(73) Assignee: United Ship Design and Development Center, Tamshui (TW)

( * ) Notice: Subject to any disclaimer, the term of this patent is extended or adjusted under 35 U.S.C. 154(b) by 732 days.

(21) Appl. No.: 12/605,420

(22) Filed: Oct. 26, 2009

(65) Prior Publication Data

US 2011/0097207 A1    Apr. 28, 2011

(51) Int. Cl.
*F03D 7/00* (2006.01)
(52) U.S. Cl.
USPC ............... 416/31; 415/914; 416/40; 416/41; 416/90 R; 416/91
(58) Field of Classification Search .............. 415/194; 416/31, 40, 41, 90 A, 90 R, 231 R, 231 B
See application file for complete search history.

(56) References Cited

U.S. PATENT DOCUMENTS

| | | | | |
|---|---|---|---|---|
| 2,643,833 A | * | 6/1953 | Ambroise | 244/226 |
| 3,144,220 A | * | 8/1964 | Kittelson | 244/203 |
| 5,938,404 A | * | 8/1999 | Domzalski et al. | 416/91 |
| 6,629,674 B1 | * | 10/2003 | Saddoughi et al. | 244/207 |
| 7,354,247 B2 | * | 4/2008 | Bonnet | 416/90 R |
| 7,581,926 B1 | * | 9/2009 | Dehlsen et al. | 416/87 |
| 7,909,575 B2 | * | 3/2011 | Barbu et al. | 416/61 |
| 2011/0084174 A1 | * | 4/2011 | Hemmelgarn et al. | 244/200 |

* cited by examiner

*Primary Examiner* — Nathaniel Wiehe
*Assistant Examiner* — Woody A Lee, Jr.
(74) *Attorney, Agent, or Firm* — Ming Chow; Sinorica, LLC

(57) ABSTRACT

A pressure relief device includes a main body and at least two air control units. The main body has at least one passage therein and two outlets formed at upper and lower ends of the passage. A lid is pivotally connected to each of the outlets. The two air control units are each disposed in the passage close to the lid. An air control device drives the air control units to open/close the lid which is adapted to open/close the passage.

5 Claims, 7 Drawing Sheets

PRESSURE RELIEF DEVICE

BACKGROUND OF THE INVENTION

1. Field of the Invention

The present invention relates to a pressure relief device.

2. Description of the Prior Art

Because of the energy crisis, every country tries to develop substitutes for petroleum, such as wind energy, solar energy, geothermal energy, tidal energy, and the like. In particular, wind energy doesn't have any pollution and is cost-effective. As shown in FIG. 1, a conventional wind power generator comprises a tower 1, a generator body 2 disposed on top of the tower 1, and a blade set 3 disposed at a front end of the generator body 2. The blade set 3 is driven to rotate by the wind, which then drives the generator body 2 to generate power such that the wind energy is converted into electric energy. The electric energy that can be generated by the wind power generator depends on the scale of the wind speed. When the wind speed is greater enough, the blade set 3 will be rotated faster. The generator body 2 may be burned out because of excessive rotations. Accordingly, an innovated wind power generator is provided with an automatic brake device. When the wind speed exceeds a predetermined value, the generator will slow down automatically or stop operation to achieve a protection effect. But, this automatic brake device cannot reduce the wind pressure which the blade set 3 bears. The blade of the wind power generator may be broken because of a greater scale of the wind speed, particularly in a place where a typhoon often happens. When the wind speed is increased, the wind power generator will be increasingly powered consequently. Accordingly, the inventor of the present invention has devoted himself based on his many years of practical experiences to provide a pressure relief device which can reduce the wind pressure of a wind power generator.

SUMMARY OF THE INVENTION

The present invention relates to a pressure relief device which can be disposed on a blade or a generator body of a wind power generator. The pressure relief device is connected with and controlled by an air control device, which comprises a main body and at least two air control units. The main body has at least one passage therein and two outlets formed at both upper and lower ends of the passage. A lid is pivotally connected to each of the outlets via a pivot, and it divides the lid into two portions. The two air control units are each disposed in the passage close to the lid. Each of the air control units comprises at least one rotation restricting member, at least two first air control members, at least one second air control member, and at least one third air control member. The rotation restricting member is located within a rotation range of the lid. The two first air control members are disposed close to the two portions respectively and located at an edge of the rotation range of the lid. The first air control members is connected with the air control device, and is controlled by the air control device in order to be engaged with the lid. The second air control member is disposed at one side of the rotation restricting member, and is connected with the air control device. The third air control member is disposed at the other side of the rotation restricting member opposite to the second air control member, and is connected to the air control device. Accordingly, when the wind power generator is in a high wind speed condition, the air control device will control the pressure relief device to open the lid for airflow to pass a blade or a generator body so as to reduce the wind pressure which the blade or the generator body bears, preventing the blade from being damaged or the wind power generator from collapsing.

DETAILED DESCRIPTION OF THE PREFERRED EMBODIMENTS

Embodiments of the present invention will now be described, by way of example only, with reference to the accompanying drawings.

Figure 1:
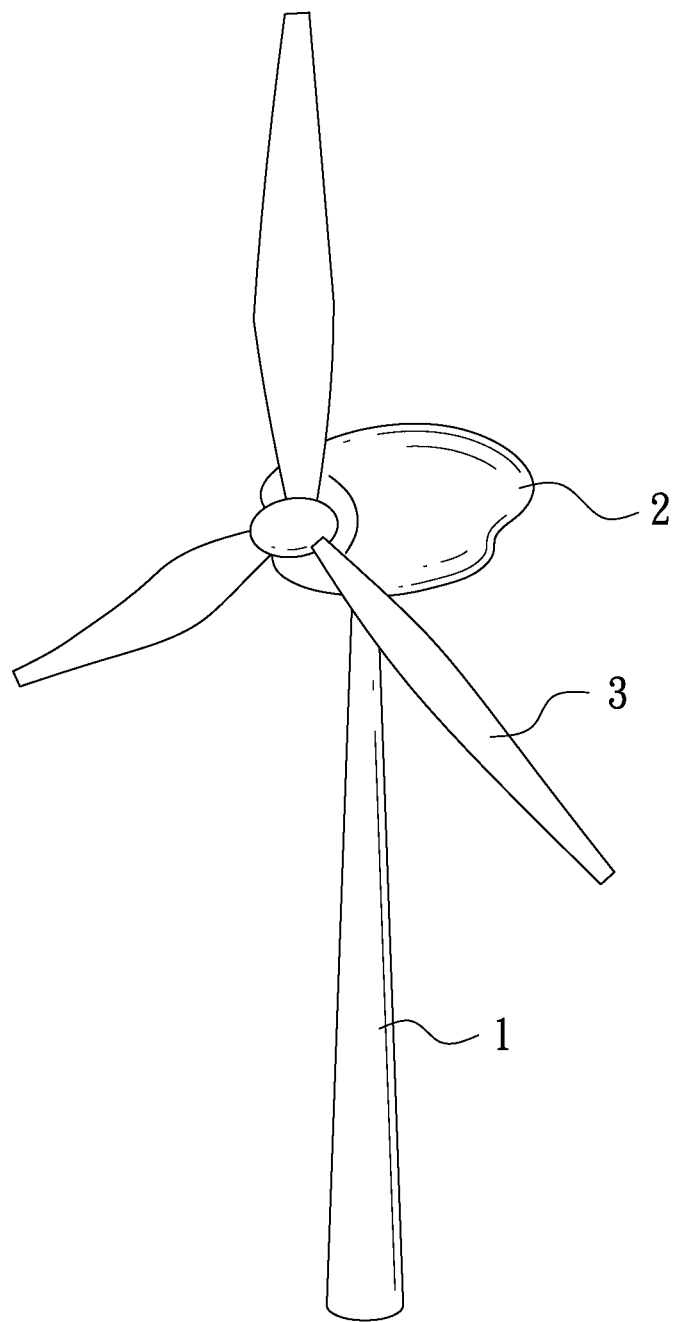
FIG. 1 is a perspective view of a conventional wind power generator.
Figure 2:
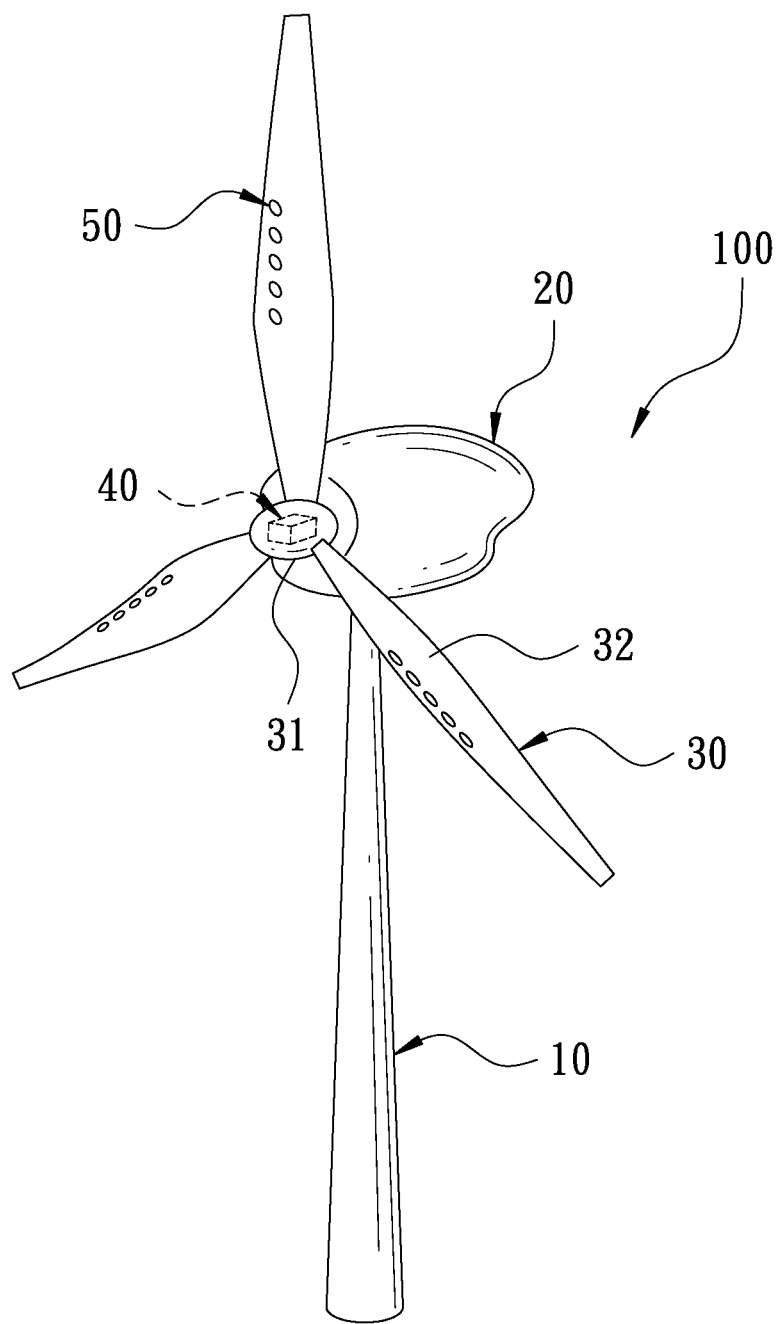
FIG. 2 is a perspective view of a wind power generator of the present invention.

FIG. 2 is a perspective view of a first embodiment of the present invention.

Figure 3:
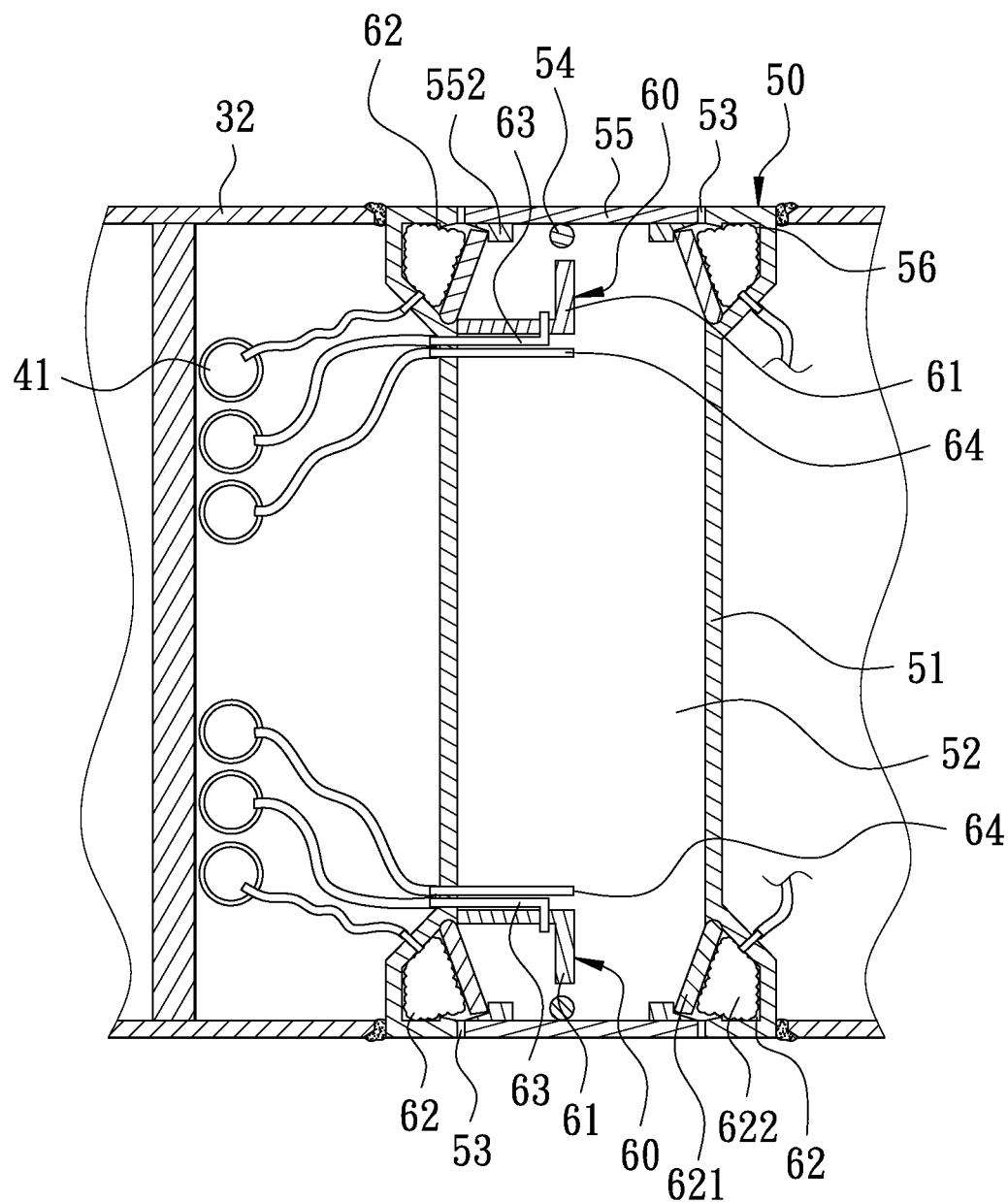
FIG. 3 is a partially cross-sectional view of a first embodiment of the present invention.

FIG. 3 is a partial cross-sectional view of the first embodiment. A wind power generator 100 comprises a tower 10, a generator body 20 disposed on top of the tower 10, a blade set 30 disposed at a front end of the generator body 20, an air control device 40 disposed at an axle cover 31 of the blade set 30, and a plurality of pressure relief devices 50 disposed on blades 32 of the blade set 30. Each of the pressure relief devices 50 comprises a main body 51 and two air control units 60.

Figure 4:
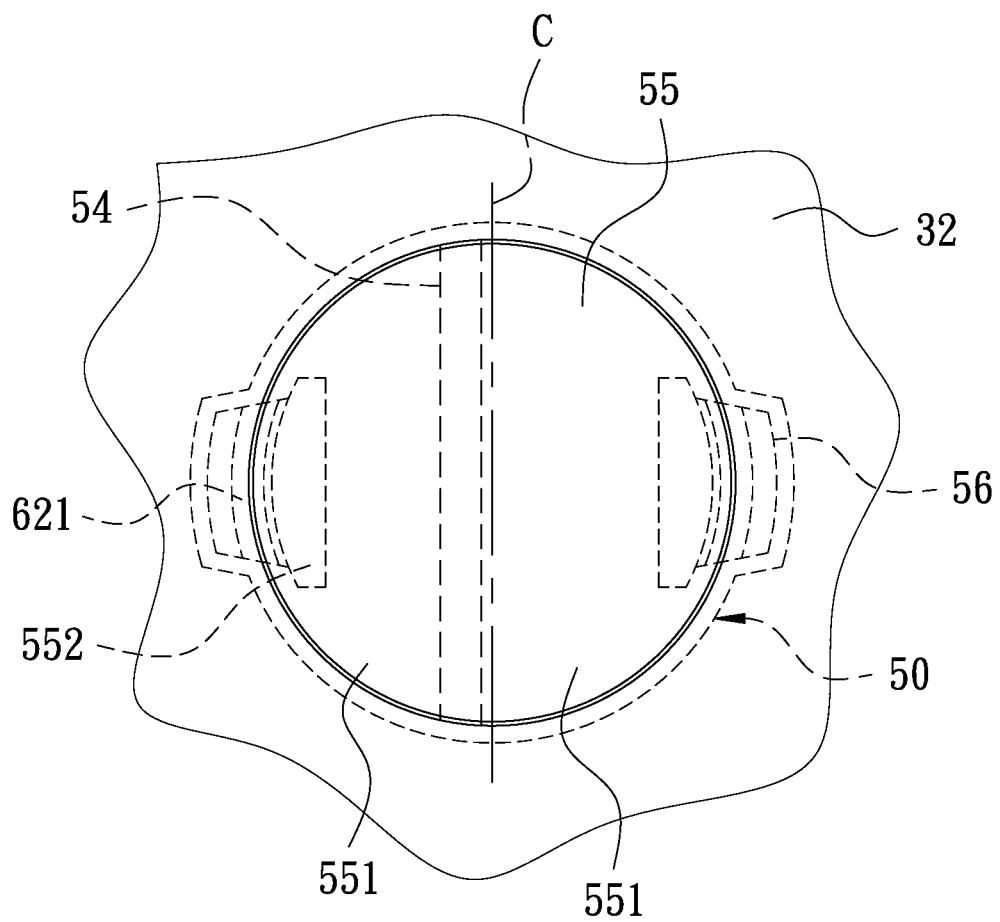
FIG. 4 is a partially top view of the first embodiment of the present invention.

The main body 51 has a passage 52 therein and two outlets 53 formed at the upper and lower ends of the passage 52. As shown in FIG. 4, a lid 55 is pivotally connected to each of the outlets 53 via an eccentric pivot 54. The eccentric pivot 54 divides the lid 55 into two portions 551 which are symmetrically provided with stop portions 552. The main body 51 has an inner wall formed with recesses 56 corresponding to the stop portions 552.

Each of the two air control units 60 is disposed in the passage 52 of the main body 51 close to the lid 55. Each of the air control units 60 comprises a rotation restricting member 61, two first air control members 62, a second air control member 63, and a third air control member 64. The rotation restricting member 61 is located within a rotation range of the lid 55. In this embodiment, the rotation restricting member 61 is disposed in the passage 52 and is placed in a line with respect to the eccentric shaft 54. The two first air control members 62 are disposed close to the two portions 551, respectively, and located at an edge of the rotation range of the lid 55. In this embodiment, the two first air control members 62 are located in the recesses 56, respectively. Each of the first air control members 62 includes a stop member 621 and an air bag 622. The stop member 621 has one end pivotally connected to the inner wall of the main body 51. The air bag 622 is located between the stop member 621 and an inner wall of the recess 62. The air bag 622 is connected to a main air supply tube 41 of the air control device 40. The second air control member 63 is an air duct which is connected to the main air supply tube 41 of the air control device 40, and has an air outlet disposed at the left of the rotation restricting member 61. The third air control member 64 is also an air duct which is connected to the main air supply tube 41 of the air control device 40, and has an air outlet disposed at the left of the rotation restricting member 61 opposite to the second air control member 63.

Figure 5:
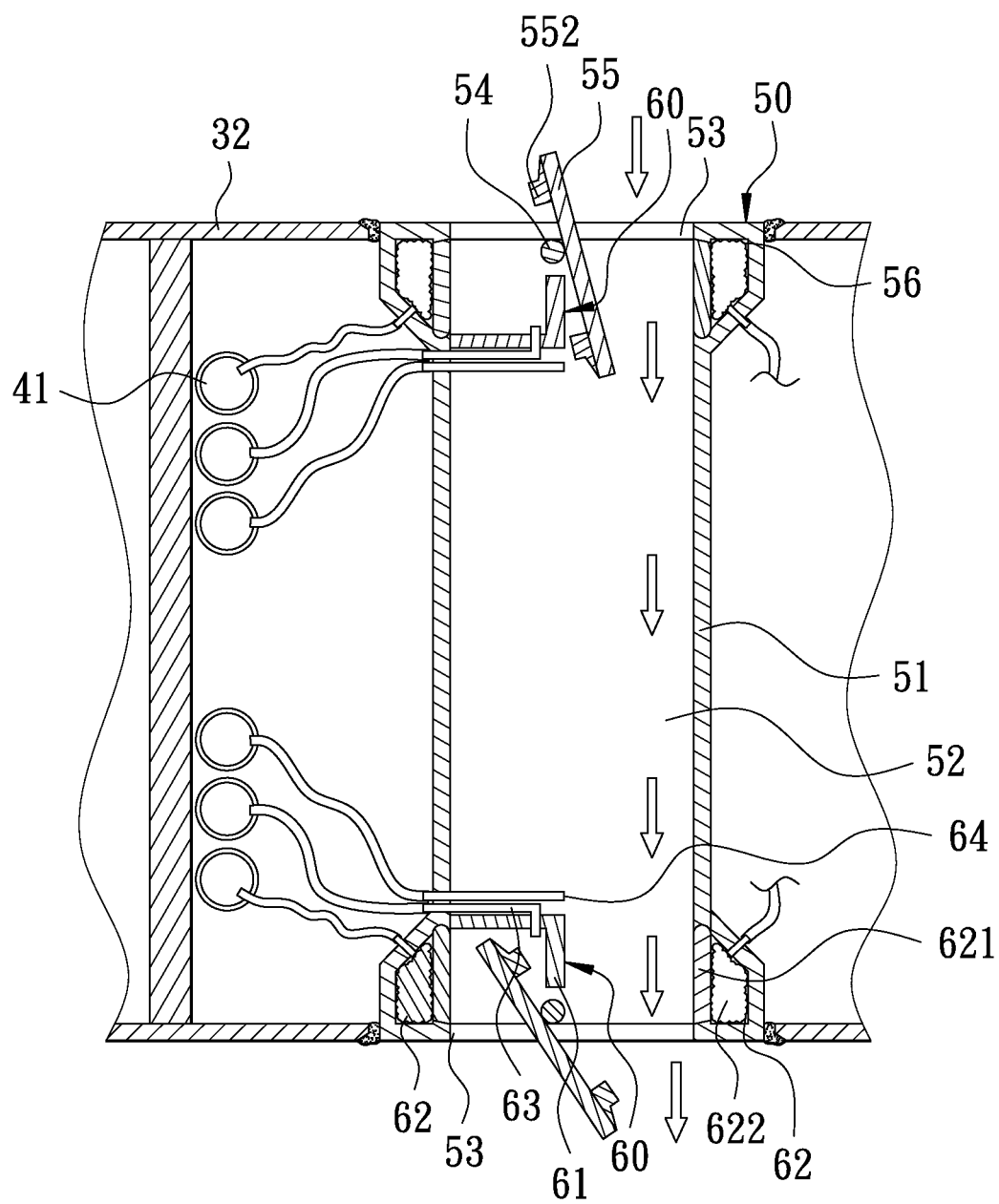
FIG. 5 is a partially cross-sectional view of the first embodiment of the present invention showing an upper end of a pressure relief device being opened.

Referring to FIGS. 3 and 5, the air control device 40 provides positive pressure to the air bag 622 of each first control member 62 so that the air bag 622 is inflatable to push the stop member 621 outward to engage with the stop portion 552 of the lid 55. Thus, the lid 55 is not rotatable so as to keep the blade 32 flat, not influencing the rotation efficiency of the blade 32.

Figure 6:
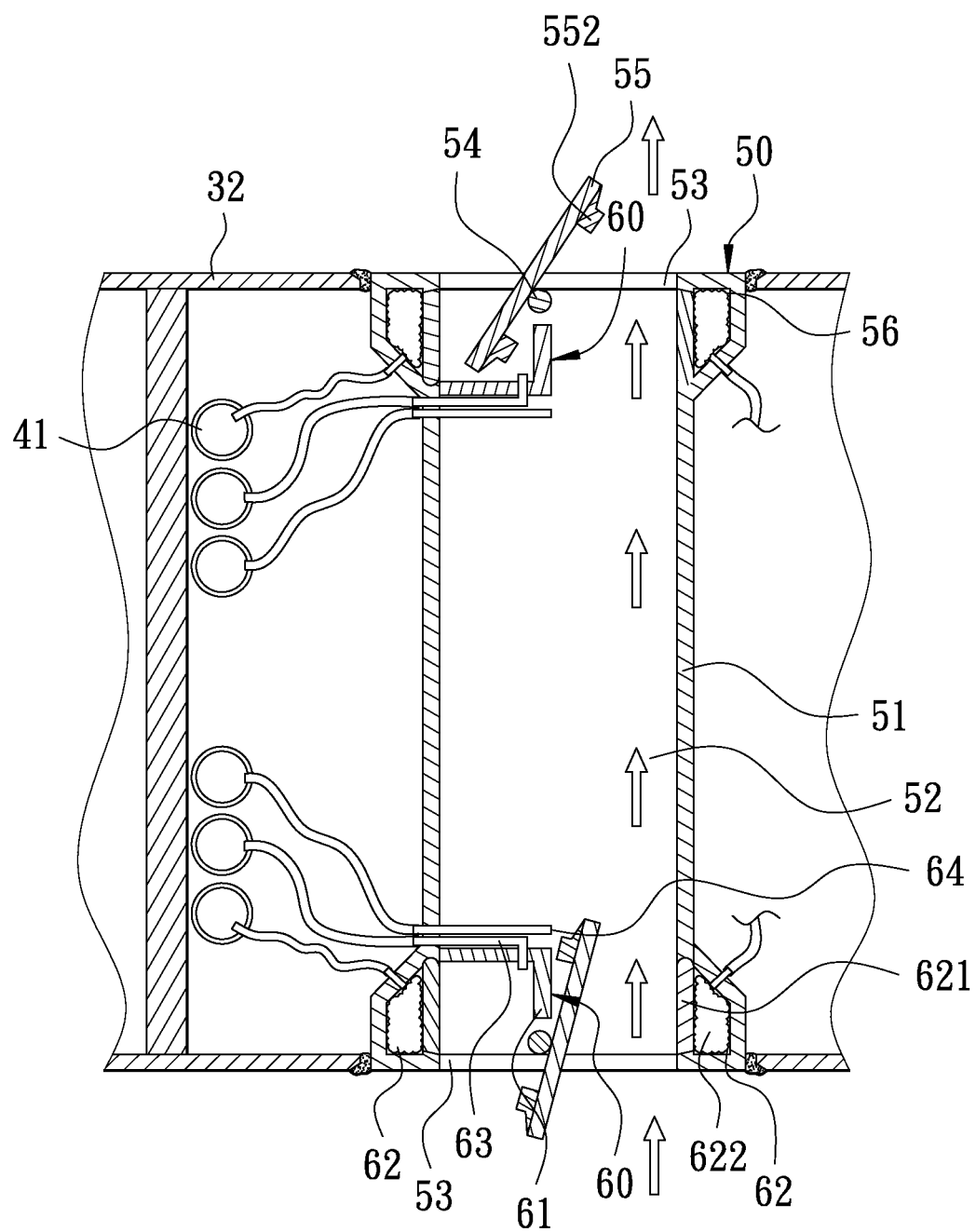
FIG. 6 is a partially cross-sectional view of the first embodiment of the present invention showing a lower end of the pressure relief device being opened.

When the wind power generator 100 is in a high wind speed condition to be in a shutdown status, the air control device 40 will provide negative pressure to the air bag 622 of each first control member 62 so that the air bag 622 is shrunk to retreat the stop member 621 inward. As shown in FIG. 5, the lid 55 is eccentrically connected to the main body 51. When an upper surface of the blade 32 bears greater wind pressure, the lid 55 located at the upper end of the passage 52 will be turned clockwise and stopped at the right of the rotation restricting member 61. The airflow enters from the outlet 53 located at the upper end of the passage 52 into the passage 52 to push the lid 55 located at the lower end of the passage 52, and the lid 55 is turned clockwise and stopped at the left of the rotation restricting member 61 to open the outlet 53 at the lower end of the passage 52, such that the two ends of the passage 52 are intercommunicated for the airflow to pass the blade 32. The wind pressure which the blade 32 bears is reduced. As shown in FIG. 6, when the lower surface of the blade 32 bears greater pressure, the lid 55 located at the lower end of the passage 52 will be turned counterclockwise to open the outlets 53, such that the airflow can pass the blasé 32, providing a pressure relief effect.

When the wind speed is reduced, the air control device 40 provides positive pressure to the air bags 622 so that the air bags 622 are inflatable to push the stop members 621 out of the recesses 56, while the air control device 40 also provides positive pressure to the third air control member 64 located at the upper end of the passage 52 and the second air control members 63 at the lower end of the passage 52 so as to blow the lids 55 to turn counterclockwise. Because the air bags 622 are not full at this time, the stop members 621 are compressed by the lids 55 to deflect toward the recesses 56. After the air bags 622 are fulfilled with air, the free ends of the lids 55 engage with the stop portions 552 of the lids 55, and the lids 55 cover the outlets 53 once again. Finally, the air control device 40 provides positive pressure to the air bags 622 once again to secure the stop members 621 so that the lids 55 are not rotatable. The blade set 30 of the wind power generator 100 is started again.

Figure 7:
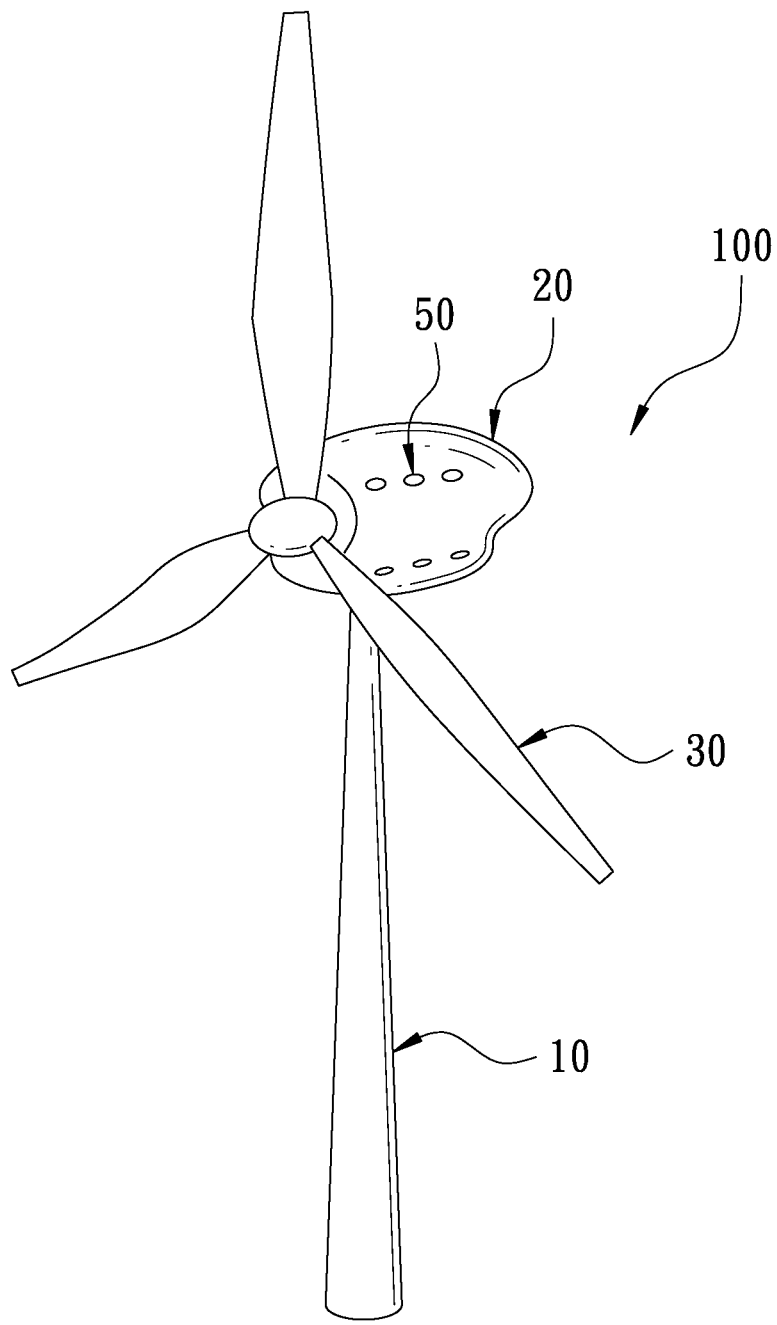
FIG. 7 is a perspective view of a second embodiment of the present invention.

FIG. 7 is a perspective view of a second embodiment of the present invention. The generator body 20 of the wind power generator 100 has a larger annular side. When the wind blows over the annular side, the annular side will bear greater wind pressure, which may influence the safety of the wind power generator 100. In this embodiment, the pressure relief device 50 is mounted on the annular side of the generator body 20, having the same effect as the first embodiment, to efficiently reduce the wind pressure which the generator body 20 bears.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A pressure relief device connected with an air control device and controlled by the air control device, comprising:
   a main body having at least one passage therein and two outlets formed at upper and lower ends of the passage
   a lid being pivotally connected to each of the two outlets via a pivot
   the pivot dividing the lid into two portions;
   the two portions of the lid being symmetrically provided with stop portions;
   the main body having an inner wall formed with recesses corresponding to the stop portions;
   at least two air control units each being disposed in the passage close to the lid;
   each of the air control units comprising at least one rotation restricting member, at least two first air control members, at least one second air control member and at least one third air control member;
   the at least one rotation restricting member being located within a rotation range of the lid;
   the at least two first air control members being disposed close to the two portions respectively and located at an edge of the rotation range of the lid;
   the at least two first air control members being connected with the air control device and controlled by the air control device to be engaged with the lid;
   each of the at least two first air control members including a stop member and an air bag, wherein the stop member having one end pivotally connected to an inner wall of the main body, the air bag being located between the stop member and the main body;
   the at least one second air control member being, an air duct, disposed at one side of the rotation restricting member and connected with the air control device; and
   the at least one third air control member being, an air duct, disposed at another side of the rotation restricting member opposite to the second air control member and connected to the air control device.

2. The pressure relief device as claimed in claim 1, wherein the air control device is disposed at an axle cover of a blade set.

3. The pressure relief device as claimed in claim 1, wherein the pressure relief device is mounted on a blade of a blade set.

4. The pressure relief device as claimed in claim 1, wherein the pressure relief device is mounted on a generator body of a wind power generator.

5. The pressure relief device as claimed in claim 1, wherein the lid is eccentrically pivoted to each of the outlets.

* * * * *